(12) United States Patent
Miyagawa et al.

(10) Patent No.: US 8,904,765 B2
(45) Date of Patent: Dec. 9, 2014

(54) INTERNAL COMBUSTION ENGINE

(71) Applicant: Kabushiki Kaisha Toyota Chuo Kenkyusho, Nagakute-shi, Aichi-ken (JP)

(72) Inventors: Hiroshi Miyagawa, Nagakute (JP); Kiyoshi Yamazaki, Toyota (JP)

(73) Assignee: Kabushiki Kaisha Toyota Chuo Kenkyusho, Nagakute-shi (JP)

( * ) Notice: Subject to any disclaimer, the term of this patent is extended or adjusted under 35 U.S.C. 154(b) by 105 days.

(21) Appl. No.: 13/866,254

(22) Filed: Apr. 19, 2013

(65) Prior Publication Data

US 2014/0311135 A1 Oct. 23, 2014

(51) Int. Cl.
*F01N 3/00* (2006.01)
*F01N 3/10* (2006.01)

(52) U.S. Cl.
CPC ........................................ *F01N 3/10* (2013.01)
USPC ................... 60/295; 60/285; 60/286; 60/301; 60/303

(58) Field of Classification Search
USPC .............................. 60/285, 286, 295, 301, 303
See application file for complete search history.

(56) References Cited

U.S. PATENT DOCUMENTS

| | | | |
|---|---|---|---|
| 2010/0107606 A1* | 5/2010 | Narayanaswamy et al. | 60/274 |
| 2010/0242440 A1* | 9/2010 | Garimella et al. | 60/276 |
| 2011/0146237 A1* | 6/2011 | Adelmann et al. | 60/274 |
| 2011/0265455 A1* | 11/2011 | Hirota et al. | 60/285 |
| 2012/0036842 A1* | 2/2012 | Nakamura | 60/287 |
| 2012/0167840 A1* | 7/2012 | Miyagawa et al. | 123/3 |

FOREIGN PATENT DOCUMENTS

JP      A-5-332152      12/1993

* cited by examiner

*Primary Examiner* — Audrey K Bradley
(74) *Attorney, Agent, or Firm* — Oliff PLC

(57) ABSTRACT

The internal combustion engine has an upstream side $NO_x$ selective reduction catalyst and a downstream side $NO_x$ selective reduction catalyst which are arranged in an engine exhaust passage. The upstream side $NO_x$ selective reduction catalyst has a region where the $NO_x$ removal rate becomes substantially constant when the ratio of concentration of ammonia to $NO_x$ of the inflowing exhaust rises. The internal combustion engine has an operating state in that region where the ratio of concentration of ammonia to $NO_x$ is maintained. The downstream side $NO_x$ selective reduction catalyst has an ammonia oxidation ability which is larger than the upstream side $NO_x$ selective reduction catalyst.

5 Claims, 4 Drawing Sheets

ововInternal Combustion Engine

INTERNAL COMBUSTION ENGINE

BACKGROUND OF THE INVENTION

1. Field of the Invention

The present invention relates to an internal combustion engine.

2. Description of the Related Art

An internal combustion engine obtains power by burning fuel in a combustion chamber. An "internal combustion engine" include engines mounted in automobiles and gas turbine engines. In addition to internal combustion engines fueled by gasoline and other fossil fuels, internal combustion engines fueled by ammonia are known. In internal combustion engines fueled by gasoline etc., when burning the fuel, carbon dioxide is produced, but in internal combustion engines fueled by ammonia, even if burning the fuel, the production of carbon dioxide can be avoided.

Japanese Patent Publication (A) No. 5-332152 discloses an ammonia burning engine, able to burn ammonia gas to obtain a drive force, which is provided with an ammonia cracking reactor which uses the exhaust gas of the combustion chambers to crack the ammonia. The exhaust gas from the combustion chambers is used to heat a heat exchange pipe in the ammonia cracking reactor. It is disclosed that the ammonia gas which is led into the heat exchange pipe is cracked into hydrogen and nitrogen by an endothermic reaction which absorbs the heat of the exhaust gas. Further, the above publication discloses to lead the cracked hydrogen into a combustion chamber or a sub combustion chamber communicated with the combustion chamber. It discloses to use hydrogen gas with its excellent ignitability to make the ammonia gas effectively burn in the combustion chamber or sub combustion chamber and improve the combustibility of the difficult-to-burn ammonia gas.

In an internal combustion engine fueled by ammonia, by burning the fuel in the combustion chambers, nitrogen oxides (NO) are produced. The exhaust which flows out from the combustion chambers contains not only unburned fuel, but also $NO_X$. In an exhaust purification system of an internal combustion engine, by arranging a device able to reduce $NO_X$ in the engine exhaust passage, it is possible to remove the $NO_X$ which is contained in the exhaust.

For example, by arranging a three-way catalyst in the engine exhaust passage, it is possible to remove the $NO_X$ which is contained in the exhaust. When arranging a three-way catalyst in the engine exhaust passage, to improve the removal rate, it is preferable to perform control so that the air-fuel ratio at the time of combustion becomes the stoichiometric air-fuel ratio. However, precise control becomes necessary for maintaining the air-fuel ratio at the time of combustion at the stoichiometric air-fuel ratio.

On the other hand, to improve the heat efficiency of the internal combustion engine or reduce the amount of fuel consumption, it is preferable to operate the engine so that the air-fuel ratio at the time of combustion becomes lean. That is, it is preferable to perform lean combustion which burns the fuel in an air-rich state. However, when arranging a three-way catalyst in the engine exhaust passage of an internal combustion engine where the air-fuel ratio at the time of combustion becomes lean, the problem arises that the $NO_X$ removal rate becomes lower.

SUMMARY OF THE INVENTION

The present invention has as its object the provision of an internal combustion engine which uses fuel containing ammonia and which is excellent in performance in purification of exhaust.

The internal combustion engine of the present invention is provided with an ammonia feeder which feeds ammonia to a combustion chamber, an upstream side $NO_X$ selective reduction catalyst which is arranged in an engine exhaust passage and which selectively reduces the $NO_X$ by the feed of a reducing agent constituted by ammonia and a downstream side $NO_X$ selective reduction catalyst which is arranged downstream of the upstream side $NO_X$ selective reduction catalyst in the engine exhaust passage and which selectively reduces the $NO_X$ by the feed of a reducing agent constituted by ammonia. The internal combustion engine performs combustion so that the air-fuel ratio at the time of combustion becomes lean. The upstream side $NO_X$ selective reduction catalyst has a first region where the $NO_X$ removal rate rises when a ratio of concentration of ammonia to $NO_X$ of the inflowing exhaust rises and a second region where the $NO_X$ removal rate becomes substantially constant when a ratio of concentration of ammonia to $NO_X$ of the inflowing exhaust rises. The engine has an operating state where the ratio of concentration of ammonia to $NO_X$ of the exhaust which flows into the upstream side $NO_X$ selective reduction catalyst is maintained in the second region. The downstream side $NO_X$ selective reduction catalyst has an ammonia oxidation ability which is larger than the upstream side $NO_X$ selective reduction catalyst.

In the above-mentioned invention, the upstream side $NO_X$ selective reduction catalyst can contain zeolite which carries iron, while the downstream side $NO_X$ selective reduction catalyst can contain zeolite which carries copper.

In the above-mentioned invention, the upstream side $NO_X$ selective reduction catalyst and the downstream side $NO_X$ selective reduction catalyst preferably have a common substrate.

In the above-mentioned invention, control is preferably performed to estimate the ratio of concentration of ammonia to $NO_X$ of the exhaust which flows into the upstream side $NO_X$ selective reduction catalyst and, when the estimated concentration ratio is less than a predetermined judgment value, to raise the ratio of concentration of ammonia to $NO_X$ of the exhaust which flows into the upstream side $NO_X$ selective reduction catalyst.

In the above-mentioned invention, it is possible to feed at least part of the ammonia which is fed from an ammonia feeder to the combustion chambers in an unburned state to the upstream side $NO_X$ selective reduction catalyst.

According to the present invention, it is possible therefore to provide an internal combustion engine which uses fuel containing ammonia and which is excellent in exhaust purification performance.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Referring to FIG. 1 to FIG. 7, an internal combustion engine according to an embodiment will be explained. In the embodiment, an internal combustion engine arranged in an automobile will be explained as an example. The internal combustion engine in the present embodiment uses ammonia and hydrogen as fuel. The internal combustion engine in the present embodiment includes a hydrogen generator which generates hydrogen from a material comprised of liquid ammonia. The internal combustion engine in the present embodiment supplies heat to the liquid ammonia to make it vaporize and thereby generates gaseous ammonia. Further, it cracks the gaseous ammonia by the cracking catalyst to generate hydrogen.

Figure 1:
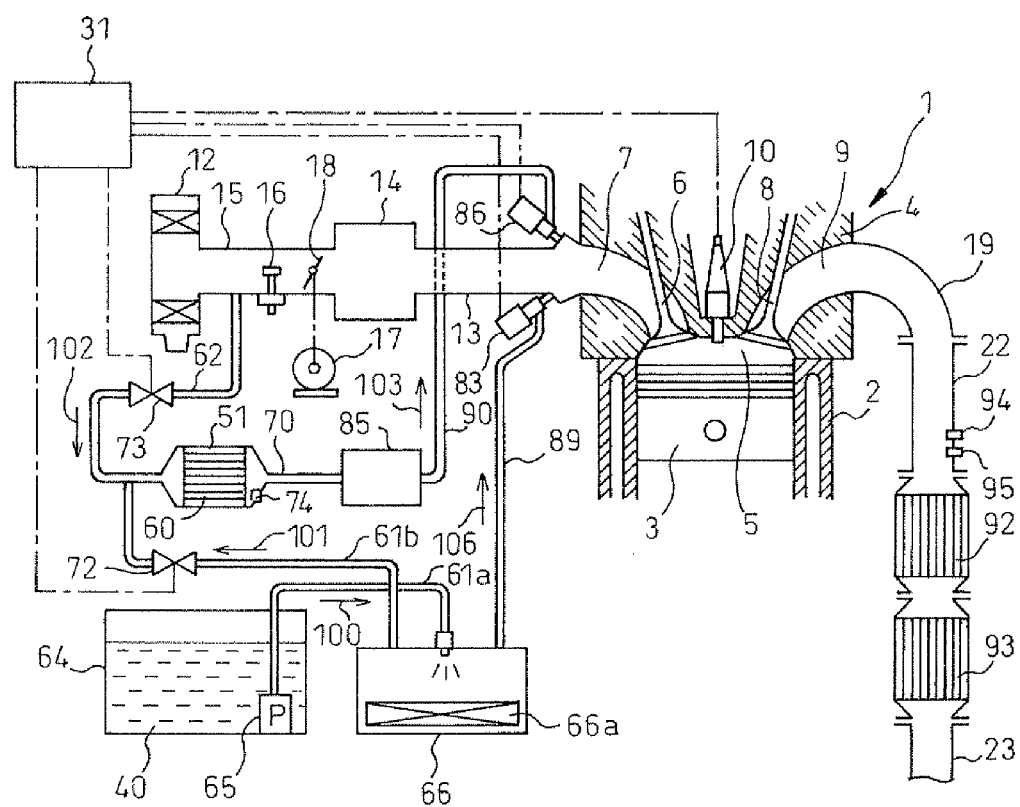
FIG. 1 is a schematic view of an internal combustion engine in an embodiment.

FIG. 1 is a schematic view of the internal combustion engine in the present embodiment. The internal combustion engine in the present embodiment is a spark ignition type. The internal combustion engine is provided with an engine body 1. The engine body 1 includes a cylinder block 2 and a cylinder head 4. Inside the cylinder block 2, pistons 3 are arranged. Combustion chambers 5 are formed by the spaces between the top surfaces of the pistons 3 and the cylinder head 4. The combustion chambers 5 are formed corresponding to the cylinders.

Each combustion chamber 5 is connected to an engine intake passage and engine exhaust passage. The cylinder head 4 is formed with intake ports 7 and exhaust ports 9. An intake valve 6 is formed so as to be able to open and close the engine intake passage communicated with each combustion chamber 5. An exhaust valve 8 is formed so as to be able to open and close the engine exhaust passage communicated with each combustion chamber 5. At the cylinder head 4, spark plugs 10 are attached as ignition devices. The spark plugs 10 are formed so as to ignite the fuel in the combustion chambers 5. The spark plugs 10 in the present embodiment are plasma jet spark plugs.

The intake port 7 of each cylinder is connected through a corresponding intake runner 13 to a surge tank 14. The surge tank 14 is connected through an intake duct 15 to an air cleaner 12. In the intake duct 15, an air flowmeter 16 is arranged for detecting the amount of intake air. Inside the intake duct 15, a throttle valve 18 driven by the step motor 17 is arranged.

The internal combustion engine in the present embodiment is provided with an exhaust purification system for purifying the exhaust gas. The exhaust port 9 of each cylinder is connected to a corresponding exhaust manifold 19. The exhaust manifold 19 is connected to an exhaust pipe 22. The exhaust purification system in the present embodiment includes two $NO_X$ selective reduction catalysts (SCR). An upstream side $NO_X$ selective reduction catalyst 92 is connected to the exhaust pipe 22. A downstream side $NO_X$ selective reduction catalyst 93 is connected to the upstream side $NO_X$ selective reduction catalyst 92. The downstream side $NO_X$ selective reduction catalyst 93 is connected to an exhaust pipe 23. The exhaust which flows out from the $NO_X$ selective reduction catalyst 93 passes through the exhaust pipe 23 and is released into the atmosphere.

In the engine exhaust passage upstream from the upstream side $NO_X$ selective reduction catalyst 92, an $NO_X$ sensor 94 is arranged which detects the $NO_X$ concentration of the exhaust which flows into the $NO_X$ selective reduction catalyst 92. Further, in the engine exhaust passage upstream from the $NO_X$ selective reduction catalyst 92, an ammonia sensor 95 is arranged which detects the ammonia concentration of the exhaust which flows into the $NO_X$ selective reduction catalyst 92. The signal of the $NO_X$ concentration which is detected by the $NO_X$ sensor 94 and the signal of the ammonia concentration which is detected by the ammonia sensor 95 are input to a controller 31.

The hydrogen generator in the present embodiment is provided with a cracker 51 for cracking ammonia. The cracker 51 in the present embodiment includes a cracking catalyst for cracking ammonia and an oxidation catalyst for oxidizing ammonia. The cracking catalyst includes catalyst particles for cracking ammonia, while the oxidation catalyst includes catalyst particles for oxidizing ammonia. The cracker 51 of the present embodiment includes the catalyst 60. The catalyst 60 in the present embodiment is comprised of the cracking catalyst and the oxidation catalyst formed integrally. That is, the catalyst 60 functions as a cracking catalyst and furthermore functions as an oxidation catalyst.

The catalyst 60 in the present example is formed as a honeycomb structure. The catalyst 60 includes a substrate in which a plurality of flow paths are formed. The substrate is, for example, formed by cordierite or a metal. On the surfaces of the flow paths of the substrate, coated layers are formed. At the coated layers, particle-like carriers carrying catalyst particles are arranged.

The catalyst 60 in the present embodiment is comprised of a single substrate on which catalyst particles for oxidizing ammonia and catalyst particles for cracking ammonia are arranged. In the present embodiment, the catalyst particles for oxidizing the ammonia and the catalyst particles for cracking the ammonia are carried on a carrier. The carrier is formed by for example aluminum oxide. As the metal of the catalyst particles for oxidizing the ammonia, platinum and other precious metals or iron or other base metals may be mentioned. The catalyst particles for oxidizing the ammonia are not limited to this. They may be formed from any metal promoting the oxidation of ammonia.

As the metal of the catalyst particles for cracking the ammonia, ruthenium or another precious metal or nickel or cobalt or another base metal may be illustrated. In the present example, ruthenium is employed. The catalyst particles for cracking the ammonia are not limited to this mode and can be formed by any metal promoting the cracking of ammonia.

The hydrogen generator in the present embodiment is formed so as to heat the catalyst 60 by a heater. The heater in the present embodiment includes an electric heater arranged around the catalyst 60. At the time of startup of the internal combustion engine, the electric heater may be powered to raise the temperature of the catalyst 60.

In this embodiment, downstream of the catalyst 60 of the cracker 51, a temperature sensor 74 is arranged for detecting the temperature of the catalyst 60. The signal of the temperature detected by the temperature sensor 74 is input to the controller 31.

The hydrogen generator in the present embodiment vaporizes the material ammonia 40 and feeds it to the cracker 51. The hydrogen generator includes a tank 64 for storing the ammonia. The tank 64 is pressurized inside it and stores liquid ammonia 40. The hydrogen generator in the present embodiment includes a pump 65 for supplying liquid ammonia 40. The pump 65 is connected to an ammonia feed pipe 61a.

The hydrogen generator includes an evaporator 66 which is connected to the ammonia feed pipe 61a. The evaporator 66 is formed so that the liquid ammonia can be heated. The evaporator 66 has the ammonia feed pipe 61b which feeds gaseous ammonia connected to it. The ammonia feed pipe 61b is connected to the inflow pipe 62 so as to discharge the gaseous ammonia to the inside of the inflow pipe 62.

The evaporator 66 in the present embodiment uses the heat exchange of the liquid ammonia and engine cooling water to vaporize the liquid ammonia. The evaporator 66 has a heat exchanger 66a. In the heat exchanger 66a of the present embodiment, engine cooling water of the engine body 1 is supplied. At the heat exchanger 66a, heat exchange is performed between the liquid ammonia and the engine cooling water.

The cracker 51 has an air feeder connected to it for feeding air. The air feeder in the present embodiment includes an inflow pipe 62 which is connected to the cracker 51. The inflow pipe 62 is connected upstream of the throttle valve 18 to the engine intake passage. In the present embodiment, the gas which flows out from the cracker 51 is injected from the hydrogen injector 86 due to the intake runners 13 becoming a negative pressure during the operating period. The cracker 51 is fed with air and ammonia. The air feeder is not limited to this and need only be formed so as to be able to feed air to the catalyst 60.

The outflow pipe 70 which is connected to the cracker 51 is connected to a cooler 85. The cooler 85 is formed so as to cool the high temperature gas which flows out from the cracker 51. The engine cooling water flows into the cooler 85 in the present embodiment. The gas which flows out from the cracker 51 is cooled by the engine cooling water.

In the middle of the ammonia feed pipe 61b, a flow regulator 72 is arranged for regulating the flow of gaseous ammonia fed to the catalyst 60. Further, in the middle of the inflow pipe 62, a flow regulator 73 is arranged for regulating the flow of air fed to the catalyst 60. The flow regulator 73 is arranged in the inflow pipe 62 at the upstream side from the position where the ammonia feed pipe 61b is connected.

The internal combustion engine in the present embodiment is provided with a hydrogen feeder which feeds hydrogen generated by the cracker 51 to the combustion chambers 5. The hydrogen feeder includes a hydrogen injector 86 which injects hydrogen toward the inside of the engine intake passage. The hydrogen injector 86 is connected through the feed pipe 90 to the cooler 85. The hydrogen which was generated at the cracker 51, as shown by the arrow 103, is fed through the outflow pipe 70, cooler 85, and feed pipe 90 to the hydrogen injector 86.

The internal combustion engine in the present embodiment is provided with an ammonia feeder which feeds ammonia to the combustion chambers 5. The ammonia feeder in the present embodiment includes an ammonia injector 83 which injects ammonia toward the inside of the engine intake passage. The ammonia injector 83 is connected through the feed pipe 89 to the evaporator 66 of the hydrogen generator. Part of the ammonia which was generated at the evaporator 66, as shown by the arrow 106, is fed through the feed pipe 89 to the ammonia injector 83. Further, the ammonia feeder in the present embodiment feeds the ammonia not cracked by the catalyst 60 to the combustion chambers 5. The ammonia which could not be cracked by the catalyst 60 is fed through the hydrogen injector 86 to the combustion chambers 5.

Note that, the hydrogen injector 86 and ammonia injector 83 in the present embodiment are formed so as to inject fuel to the engine intake passage, but the invention is not limited to this. These injectors may also be formed so as to feed fuel into the combustion chambers 5. For example, these injectors may be arranged to directly inject fuel to the combustion chambers 5.

The internal combustion engine in the present embodiment is provided with a controller 31. The controller 31 in the present embodiment includes a digital computer. The controller 31 receives as input the output of the air flow meter 16 and signals etc. of the temperature sensor included in the hydrogen generator. The controller 31 controls the step motor 17 driving the throttle valve 18. Further, the controller 31 controls the hydrogen injector 86, ammonia injector 83, and spark plugs 10. The controller 31 controls the pump 65 and flow regulators 72 and 73. In this way, the controller 31 controls the devices included in the engine body and the hydrogen generator.

The hydrogen generator in the present embodiment uses the electric heater to raise the temperature of the catalyst 60 at the time of startup. The controller 31 drives the pump 65 and sets the flow regulator 72 to the open state. The liquid ammonia 40, as shown by the arrow 100, is fed to the evaporator 66. In the evaporator 66, the liquid ammonia 40 changes to a gas. The now gaseous ammonia passes through the ammonia feed pipe 61b and is fed inside the inflow pipe 62 such as shown by the arrow 101.

On the other hand, the controller 31 opens the flow regulator 73, whereby, as shown by the arrow 102, air flows in toward the catalyst 60. In this way, the hydrogen generator in the present embodiment feeds air to the catalyst 60 in addition to the ammonia.

The gas which flows into the catalyst 60 includes air, so part of the ammonia which is fed is oxidized by the action of the oxidation catalyst of the catalyst 60. The ammonia undergoes an oxidation reaction as shown by the following formula.

$$NH_3 + (3/4)O_2 \rightarrow (1/2)N_2 + (3/2)H_2O \qquad (1)$$

The oxidation of ammonia is an exothermic reaction. For this reason, the catalyst 60 is heated. The ammonia which could not be used for the oxidation reaction undergoes a cracking reaction due to the cracking catalyst of the catalyst 60. The ammonia is reformed to nitrogen and hydrogen. The cracking reaction of ammonia occurs as shown in the following formula:

$$NH_3 \rightarrow (1/2)N_2 + (3/2)H_2 \qquad (2)$$

The ammonia cracking reaction occurs at a predetermined temperature or more. Further, the ammonia cracking reaction is an endothermic reaction. In the hydrogen generator of the present embodiment, the catalyst 60 can oxidize part of the ammonia and use the heat of oxidation to crack the ammonia. The cracked gas which flows out from the cracking catalyst 60 contains hydrogen and nitrogen and also water vapor. The generated cracked gas, as shown by the arrow 103, flows out from the outflow pipe 70.

The hydrogen generator in the present embodiment is provided with a device for regulating the flow of ammonia fed to the catalyst 60 and a device for regulating the flow of air fed to the catalyst 60. The hydrogen generator in the present embodiment is provided with a flow regulator for regulating the ratio of the flow of air to the flow of ammonia fed to the catalyst 60.

The hydrogen generator in the present embodiment continuously cracks the ammonia. During its operating period, the electrification of the electric heater is stopped. The heat of oxidation at the catalyst 60 can be used for cracking the ammonia. The cracker 51 can crack the ammonia without supplying heat from the outside.

In this embodiment, the hydrogen generated at the cracker 51 of the hydrogen generator is injected by the hydrogen injector 86 to the inside of the intake runners 13. Part of the gaseous ammonia which is formed at the evaporator 66 of the hydrogen generator is injected from the ammonia injector 83 into the intake runners 13. The mixture of the hydrogen and ammonia passes through the intake ports 7 and is fed to the combustion chambers 5. At the combustion chambers 5, the fuel burns and exhaust is generated.

The amount of feed of the ammonia and the amount of feed of the hydrogen at the time of ordinary operation of the internal combustion engine in the present embodiment can, for example, be determined based on the speed and required load of the internal combustion engine. A map of the amounts of feed of the different fuels having the speed and required load of the internal combustion engine as functions is prepared in advance. This map can be stored in the controller 31.

In this embodiment, the required load is detected from the amount of depression of the accelerator pedal and the engine speed is detected by the output etc. of the crank angle sensor. Using the map stored in the controller 31, it is possible to set the amount of feed of ammonia and the amount of feed of hydrogen. The controller 31 can control the ammonia injector 83 and hydrogen injector 86 based on the set amount of feed of the ammonia and amount of feed of the hydrogen. The ammonia concentration and hydrogen concentration of the gas which flows out from the catalyst 60 can for example by detected by arranging sensors for detecting these concentrations at the outlet of the catalyst 60. Alternatively, the temperature of the catalyst 60 and the amount of air and the amount of ammonia which are fed to the catalyst 60 may be used as the basis to estimate the ammonia concentration and hydrogen concentration of the cracked gas which flows out from the catalyst 60.

The exhaust purification system of the internal combustion engine in the present embodiment includes an upstream side $NO_X$ selective reduction catalyst 92 and a downstream side $NO_X$ selective reduction catalyst 93 which are connected to each other in series. The $NO_X$ selective reduction catalysts can selectively reduce $NO_X$ by feed of a reducing agent. The $NO_X$ selective reduction catalysts in the present embodiment use ammonia as the reducing agent to reduce the $NO_X$.

The internal combustion engine in the present embodiment is formed so as to perform combustion by an air-fuel mixture which is leaner than the stoichiometric air-fuel ratio. That is, it performs lean combustion so that the air-fuel ratio at the time of combustion becomes lean. The exhaust gas which flows out from the combustion chambers contains oxygen. The $NO_X$ selective reduction catalyst can reduce the $NO_X$ to nitrogen in the presence of oxygen by using ammonia as a reducing agent. $NO_X$ includes nitrogen monoxide and nitrogen dioxide. The amount of ammonia which is required in a reducing reaction is 1 to 1 by molar ratio with respect to $NO_X$. When the $NO_X$ selective reduction catalyst is reducing $NO_X$, the oxygen which is contained in the exhaust is used to simultaneously oxidize the ammonia. For this reason, the ratio of the ammonia to $NO_X$ of the exhaust which flows into the $NO_X$ selective reduction catalyst is preferably controlled to become larger than 1.

When the $NO_X$ selective reduction catalyst is reducing $NO_X$, excessive ammonia may also be removed. A $NO_X$ selective reduction catalyst has the properties of differing speed of $NO_X$ reduction reaction and speed of oxidation reaction of the ammonia depending on the type of the catalyst etc. The $NO_X$ removal rate in the $NO_X$ selective reduction catalyst and the ammonia removal rate depend on the ratio of concentration of ammonia to $NO_X$ of the exhaust which flows into the $NO_X$ selective reduction catalyst. In the present invention, the ratio of concentration of ammonia to $NO_X$ of the exhaust which flows into the upstream side $NO_X$ selective reduction catalyst is called the "ratio of concentration of inflow".

The upstream side $NO_X$ selective reduction catalyst 92 in the present embodiment is formed so that the $NO_X$ removal rate become higher in part of the operating regions. As opposed to this, the downstream side $NO_X$ selective reduction catalyst 93 is formed so that the ammonia removal rate becomes higher in substantially all of the operating regions. In the present embodiment, the upstream side $NO_X$ selective reduction catalyst 92 contains zeolite which carries iron by ion exchange.

The downstream side $NO_X$ selective reduction catalyst 93 contains zeolite which carries copper by ion exchange. The downstream side $NO_X$ selective reduction catalyst 93 of the present embodiment carries catalyst particles of a metal for promoting the oxidizing function of ammonia. As the metal of the catalyst particles which promotes the oxidation reaction of ammonia, for example, at least one metal among platinum (Pt), rhodium (Rh), palladium (Pd), and ruthenium (Ru) may be illustrated. By having the downstream side $NO_X$ selective reduction catalyst contain catalyst particles which promote the oxidation reaction of ammonia, it is possible to improve the ammonia removal rate.

Figure 2:
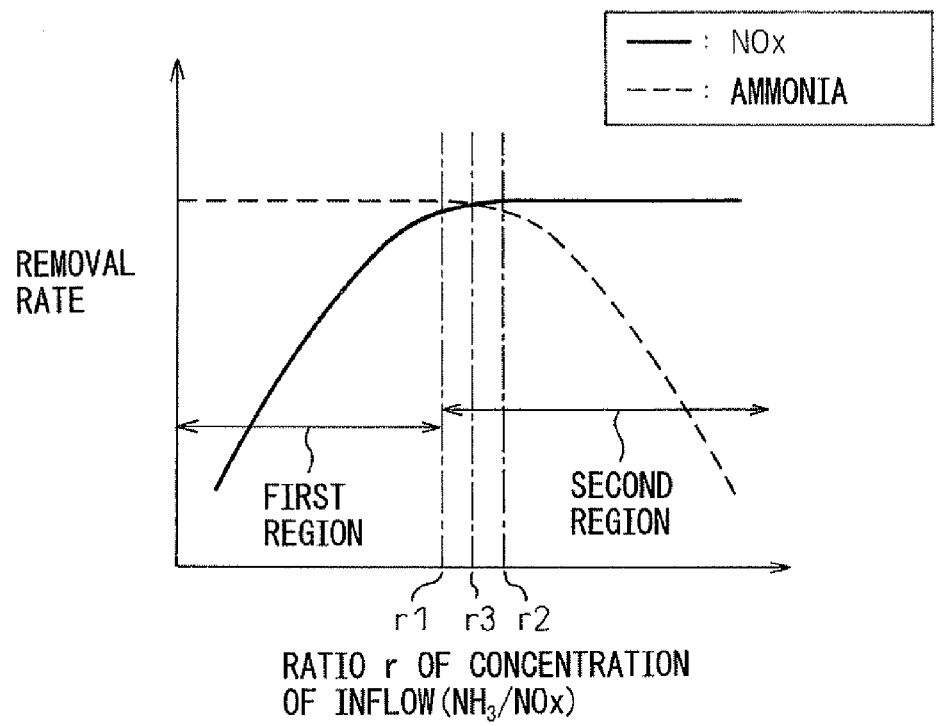
FIG. 2 is a graph which explains removal rates of an upstream side $NO_X$ selective reduction catalyst in the embodiment.

FIG. 2 is a graph of the removal rate of the upstream side $NO_X$ selective reduction catalyst in the present embodiment. The abscissa shows the ratio "r" of concentration of inflow, that is, the ratio of the molar concentration of ammonia to $NO_X$ which is contained in the exhaust. The ordinate shows the purification rate. This is shown by the following formula:

$$\text{(Removal rate)} = \frac{\begin{pmatrix} \text{concentration of substance flowing into} \\ NO_x \text{ selective reduction catalyst} - \\ \text{concentration of substance flowing out from} \\ NO_x \text{ selective reduction catalyst} \end{pmatrix}}{\begin{pmatrix} \text{concentration of substance flowing into } NO_x \\ \text{selective reduction catalyst} \end{pmatrix}} \quad (3)$$

The upstream side $NO_X$ selective reduction catalyst 92 has a first region where the ratio "r" of concentration of inflow rises and the $NO_X$ removal rate rises and a second region where when the ratio r of concentration of inflow rises as well, the $NO_X$ removal rate becomes substantially constant. The second region is a region with a larger ratio of concentration of inflow than the first region. In the present embodiment, the region where the ratio r of concentration of inflow is r1 or less is set as the first region. Further, the region where the ratio of concentration of inflow is larger than r1 is set as the second region. In the upstream side $NO_X$ selective reduction catalyst 92 of the present embodiment, in the region of a ratio of concentration of inflow larger than r1, the $NO_X$ removal rate becomes substantially 100%.

On the other hand, the ammonia removal rate of the upstream side $NO_X$ selective reduction catalyst 92 is a substantially constant removal rate in the region of a ratio of concentration of inflow of r2 or less. In the present embodiment, the catalyst has a substantially 100% ammonia removal rate. If ratio of concentration of inflow becomes larger than r2, the larger the ratio "r" of concentration of inflow becomes, the more the ammonia removal rate falls.

Figure 3:
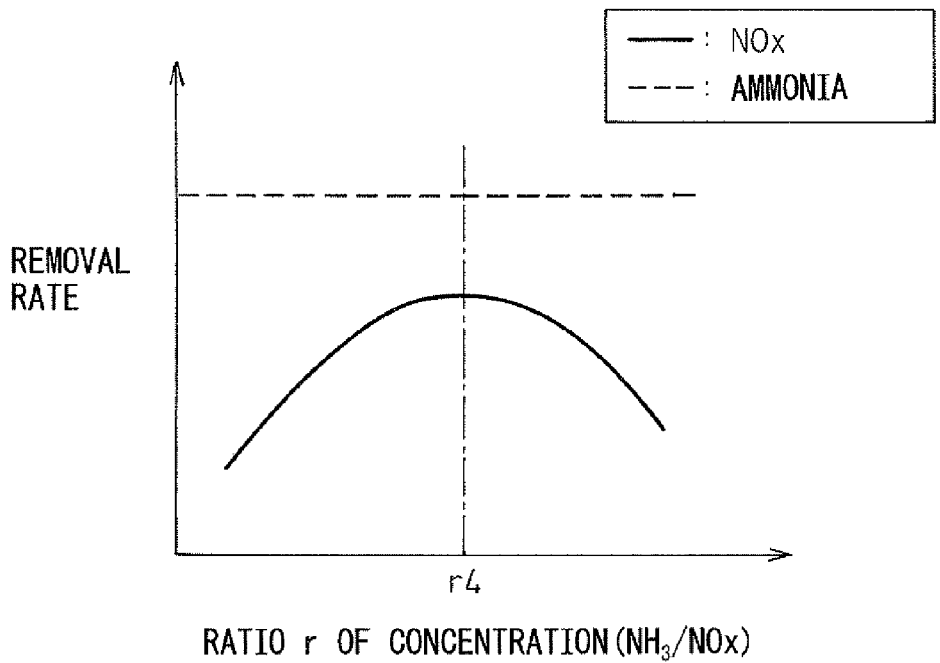
FIG. 3 is a graph which explains removal rates of a downstream side $NO_X$ selective reduction catalyst in the embodiment.

FIG. 3 is a graph of the removal rate of the downstream side $NO_X$ selective reduction catalyst in the present embodiment. The abscissa is the ratio of concentration of ammonia to $NO_X$ of the exhaust which flows into the downstream side $NO_X$ selective reduction catalyst 93. For the downstream side $NO_X$ selective reduction catalyst in the present embodiment, a catalyst with a high ammonia oxidation ability is selected. For this reason, the downstream side $NO_X$ selective reduction catalyst has a high ammonia removal rate. In the downstream side $NO_X$ selective reduction catalyst of the present embodiment, it is possible to remove the ammonia by a high removal rate without depending on the ratio of concentration of ammonia to $NO_X$ flowing in. The downstream side $NO_X$ selective reduction catalyst 93 in the present embodiment has an ammonia removal rate of substantially 100% in substantially all of the operating regions.

The $NO_X$ removal rate of the downstream side $NO_X$ selective reduction catalyst 93 rises the larger the ratio of concentration of ammonia to $NO_X$ of the inflowing exhaust in the region where the ratio of concentration of ammonia to $NO_X$ of the exhaust which flows into the downstream side $NO_X$ selective reduction catalyst 93 is r4 or less. If the ratio of concentration becomes larger than r4, the larger the ratio of concentration of ammonia to $NO_X$ of the inflowing exhaust becomes, the more the removal rate falls.

In the internal combustion engine of the present embodiment, the downstream side $NO_X$ selective reduction catalyst 93 is better in ammonia oxidation ability than the upstream side $NO_X$ selective reduction catalyst 92 under conditions of the same catalyst temperature and flow rate of inflowing gas. For example, the ammonia removal rate of the downstream side $NO_X$ selective reduction catalyst 93 becomes higher than the ammonia removal rate of the upstream side $NO_X$ selective reduction catalyst 92 in the region where the ratio of concentration of inflow is larger than r2. In particular, the internal combustion engine in the present embodiment has a higher ammonia removal rate of the downstream side $NO_X$ selective reduction catalyst 93 than the ammonia removal rate of the upstream side $NO_X$ selective reduction catalyst 92 in substantially all of the operating regions (second region).

Further, the upstream side $NO_X$ selective reduction catalyst 92 has a better $NO_X$ removal ability than the downstream side $NO_X$ selective reduction catalyst 93 under the same conditions of catalyst temperature, flow rate of inflowing gas, etc. For example, the maximum value of the $NO_X$ removal rate of the upstream side $NO_X$ selective reduction catalyst 92 is larger than the maximum value of the $NO_X$ removal rate of the downstream side $NO_X$ selective reduction catalyst 93. In particular, the internal combustion engine in the present embodiment has a higher $NO_X$ removal rate of the upstream side $NO_X$ selective reduction catalyst 92 than the $NO_X$ removal rate of the downstream side $NO_X$ selective reduction catalyst 93 in substantially all of the operating regions (second region).

Referring to FIG. 2, the upstream side $NO_X$ selective reduction catalyst 92 has a ratio r3 of concentration of inflow where the $NO_X$ removal rate and the ammonia removal rate mutually intersect. The ratio r3 of concentration of inflow depends also on the structure and material of the $NO_X$ selective reduction catalyst. As the ratio r3 of concentration of inflow of the $NO_X$ selective reduction catalyst, 1 to 1.6 may be illustrated.

The internal combustion engine of the present embodiment operates in a region where the air-fuel ratio at the time of combustion at the combustion chambers is lean. In an internal combustion engine where the air-fuel ratio at the time of combustion is lean, the ratio of concentration of ammonia to $NO_X$ of the exhaust which flows out from the combustion chambers exceeds 1 in substantially all of the operating states. That is, the ratio r of concentration of inflow exceeds 1 in substantially all of the operating states. In the internal combustion engine of the present embodiment, the ratio of concentration of inflow becomes larger than r1 in substantially all of the operating states. The ratio of concentration of inflow is maintained in the second region. For this reason, in the upstream side $NO_X$ selective reduction catalyst 92, the $NO_X$ which is contained in the exhaust can be removed by a high removal rate. Further, it is possible to simultaneously oxidize at least part of the ammonia. Even when ammonia is produced which flows out without being oxidized at the upstream side $NO_X$ selective reduction catalyst 92, it can be removed by the downstream side $NO_X$ selective reduction catalyst 93. The downstream side $NO_X$ selective reduction catalyst 93 can remove the ammonia by a high removal rate. Further, when $NO_X$ flows out from the upstream side $NO_X$ selective reduction catalyst 92, the downstream side $NO_X$ selective reduction catalyst 93 can remove the $NO_X$.

In this way, in the internal combustion engine in the present embodiment, in substantially all of the operating states, it is possible to remove the $NO_X$ and ammonia which flow out from the combustion chambers by a high removal rate. Further, precise control, such as when arranging a three-way catalyst in the engine exhaust passage, to make the air-fuel ratio at the time of combustion match the stoichiometric air-fuel ratio is unnecessary. Operation is possible over a wide operating range. The internal combustion engine in the present embodiment can therefore exhibit an excellent exhaust purification performance.

In the present embodiment, in substantially all of the operating states, the ratio of concentration of inflow is maintained in the second region, but the invention is not limited to this. There may also be a time period during which the ratio of concentration of inflow is maintained in the second region. Alternatively, the operating state may be determined in advance so that the ratio of concentration of inflow is maintained in the second region and the engine may be operated in this predetermined operating state.

Note that, regarding the arrangement of the plurality of $NO_X$ selective reduction catalysts, the order of the $NO_X$ selective reduction catalyst 92 which is excellent in $NO_X$ removal ability and the $NO_X$ selective reduction catalyst 93 which is excellent in ammonia removal rate may be reversed. That is, the $NO_X$ selective reduction catalyst 93 which is excellent in ammonia removal rate may be arranged at the upstream side. However, in this case, the $NO_X$ selective reduction catalyst 93 ends up oxidizing a large amount of ammonia, so the reducing agent is liable to become insufficient at the $NO_X$ selective reduction catalyst 92. The $NO_X$ which could not be removed at the $NO_X$ selective reduction catalyst 93 is liable to not be able to be sufficiently removed at the $NO_X$ selective reduction catalyst 92. For this reason, it is preferable to arrange the $NO_X$ selective reduction catalyst 92 which is superior in $NO_X$ removal rate at the upstream side and arrange the $NO_X$ selective reduction catalyst 93 which is superior in ammonia removal rate at the downstream side.

Alternatively, instead of the downstream side $NO_X$ selective reduction catalyst, it may be considered to arrange an oxidation catalyst for oxidizing the ammonia. In this case as well, it is possible to oxidize the ammonia which is contained in the exhaust. In this regard, if arranging an oxidation catalyst, $NO_X$ is liable to be produced along with the oxidation of ammonia. Further, if $NO_X$ flows out from an upstream side $NO_X$ selective reduction catalyst, the $NO_X$ is liable to not be sufficiently removed. For this reason, for the downstream side catalyst, it is preferable to place an $NO_X$ selective reduction catalyst which can remove $NO_X$ and, furthermore, has a high ammonia oxidation function. Even if oxidation of ammonia leads to the production of $NO_X$, the selective reduction function can be used to remove the $NO_X$.

The downstream side $NO_X$ selective reduction catalyst of the present embodiment has catalyst particles of a metal for promoting the oxidation function of ammonia, but the invention is not limited to this. The downstream side $NO_X$ selective reduction catalyst need not be provided with catalyst particles of a metal for promoting the oxidation reaction of ammonia.

In the present embodiment, the upstream side $NO_X$ selective reduction catalyst contains zeolite which carries iron, while the downstream side $NO_X$ selective reduction catalyst contains zeolite which carries copper, but the invention is not limited to this. It is also possible to select a plurality of $NO_X$ selective reduction catalysts with oxidation abilities differing from each other and arrange them so that a downstream side $NO_X$ selective reduction catalyst has a larger oxidation ability than an upstream side $NO_X$ selective reduction catalyst.

Referring to FIG. 2, the internal combustion engine in the present embodiment operates in substantially all operating regions so that the ratio of concentration of ammonia to $NO_X$ of the exhaust which flows into the upstream side $NO_X$ selective reduction catalyst 92 becomes within the second region. In this regard, in a predetermined operating state of the internal combustion engine, sometimes the ratio of concentration of inflow becomes smaller and becomes r1 or less. That is, sometimes the engine operates in the first region. Alternatively, depending on the type of the selected $NO_X$ selective reduction catalyst etc., sometimes the engine is operated in a region of a small ratio of concentration of inflow where the $NO_X$ removal rate becomes lower. When the $NO_X$ removal rate becomes low in this way, the control for raising the ratio of concentration of inflow can be performed.

Next, the operational control for changing the ratio of concentration of inflow in the present embodiment will be explained. Referring to FIG. 1, the internal combustion engine in the present embodiment uses fuel containing ammonia. It is possible to leave at least part of the ammonia which is fed from the ammonia feeder to the combustion chambers 5 in the unburned state and to feed the unburned ammonia to the upstream side $NO_X$ selective reduction catalyst. Furthermore, it is possible to adjust the operating state of the internal combustion engine so as to adjust the amount of ammonia which is fed to the $NO_X$ selective reduction catalyst.

In an internal combustion engine of the related art, to feed a reducing agent comprised of ammonia to the $NO_X$ selective reduction catalyst, a urea injector was arranged in the engine exhaust passage to inject a urea solution and urea was fed to the inside of the engine exhaust passage. The urea solution which was fed to the inside of the engine exhaust passage was hydrolyzed by the heat of the exhaust whereby ammonia was produced. For this reason, when arranging an $NO_X$ selective reduction catalyst in an exhaust purification system of an internal combustion engine of the related art, a urea injector or urea tank or other device which feeds a urea solution to the engine exhaust passage was necessary. As opposed to this, the internal combustion engine in the present embodiment can change the operating state so as to feed ammonia to the $NO_X$ selective reduction catalyst. Even if not placing a device which feeds urea to the engine exhaust passage, it is possible to feed ammonia to the $NO_X$ selective reduction catalyst and remove the $NO_X$.

In operational control which changes the ratio of concentration of inflow in the present embodiment, it is possible to change the ratio of hydrogen to ammonia of the fuel which is fed to the combustion chambers so as to adjust the ratio of concentration of ammonia to $NO_X$ of the exhaust which flows out from the combustion chambers.

Hydrogen is superior in combustibility to ammonia, so has the function of promoting the combustion of ammonia. If increasing the ratio of ammonia to hydrogen of the fuel which is fed to the combustion chambers, the combustion in the combustion chambers becomes slower. By reduction of the ratio of hydrogen which functions as a material which assists the combustion of fuel, the speed of combustion in the combustion chambers becomes slower. For this reason, the unburned ammonia which remains without being burned in the combustion chambers becomes greater. On the other hand, the amount of $NO_X$ which is included in the exhaust which is exhausted from the combustion chambers decreases, so the ratio of concentration of inflow can be raised.

In the present embodiment, the ratio of the hydrogen to the ammonia which is fed to the hydrogen injector is changed so as to change the ratio of hydrogen to ammonia of the fuel which is fed to the combustion chambers. The hydrogen generator of the present embodiment feeds ammonia to the catalyst 60 so as to generate hydrogen. The gas which flows out from the cracker 51 contains, in addition to hydrogen, the ammonia which was not cracked. The concentration of ammonia and the concentration of hydrogen which flow out from the cracker 51 can be adjusted by changing the ratio of air to ammonia which is fed to the cracker 51.

Figure 4:
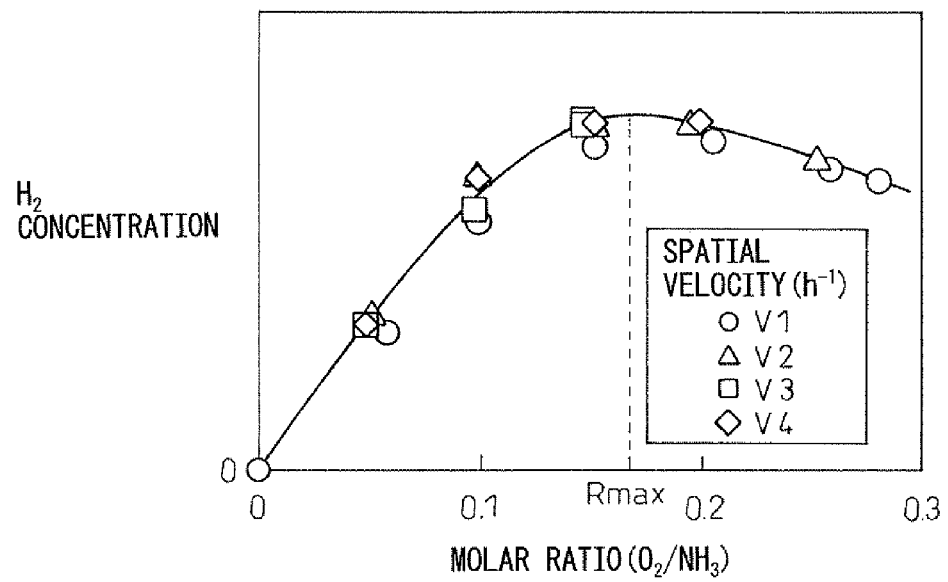
FIG. 4 is a graph which shows the relationship between a molar ratio of gas which flows into a cracker and a hydrogen concentration of gas which flows out from the cracker in the embodiment.

FIG. 4 is a graph which explains the relationship of the molar ratio of oxygen to ammonia of the gas which is fed to the cracker of the present embodiment and a hydrogen concentration of gas which flows out from the cracker. In FIG. 4, instead of the molar ratio of air, this is shown by the molar ratio of oxygen. In this test, the spatial velocity is changed from the velocity V1 to the velocity V4 to conduct a plurality of tests. It is learned that if gradually making the molar ratio of oxygen to ammonia rise from near zero, the hydrogen concentration of the produced gas rises. At the molar ratio Rmax, the hydrogen concentration becomes maximum. In the region larger than the molar ratio Rmax, the larger the molar ratio becomes, the more the hydrogen concentration is reduced.

Figure 5:
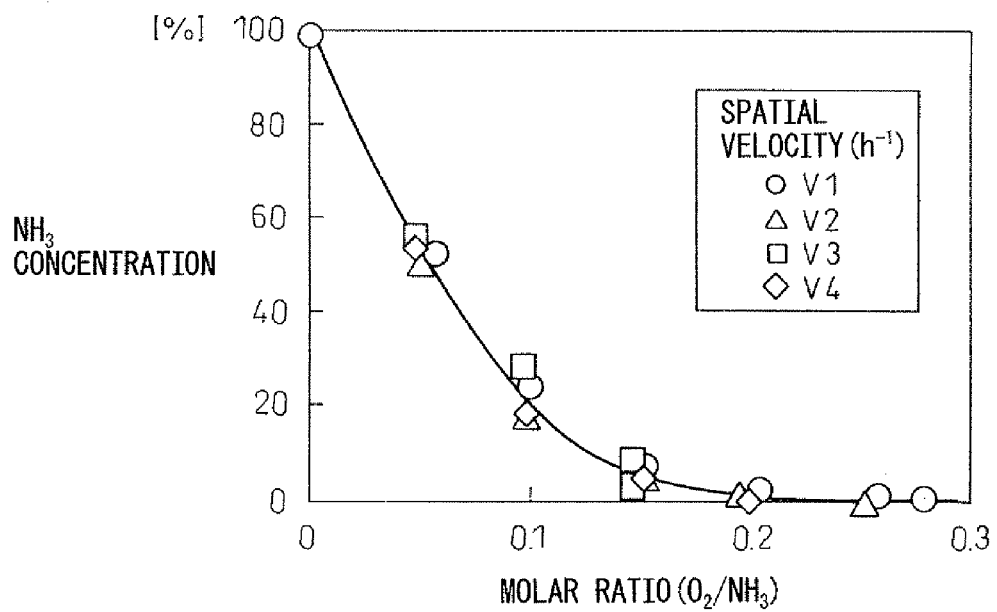
FIG. 5 is a graph which shows the relationship between a molar ratio of gas which flows into a cracker and an ammonia concentration of gas which flows out from the cracker in the embodiment.

FIG. 5 is a graph which explains the relationship of the molar ratio of oxygen to ammonia of the gas which is fed to the cracker of the present embodiment and an ammonia concentration of gas which flows out from the cracker. The ordinate is the concentration of ammonia which flows out from the cracker without being cracked. It is learned that if raising the molar ratio of oxygen to ammonia, the concentration of ammonia which flows out from the cracker falls. If the molar ratio of oxygen to ammonia is about 0.2, it is learned that the ammonia concentration of gas which flows out from the cracker becomes zero. That is, it is learned that the ammonia which is fed to the cracker is substantially completely consumed.

Referring to FIG. 4 and FIG. 5, in the region where the molar ratio of oxygen to ammonia is small, the amount of heat is insufficient for cracking ammonia. If making the molar ratio of oxygen to ammonia rise, the temperature of the catalyst rises. For this reason, the hydrogen concentration of the gas which flows out from the cracker rises and the ammonia concentration of the gas which flows out from the cracker falls.

In this regard, if the molar ratio of oxygen to ammonia exceeds about 0.2, all of the ammonia which is fed is consumed. Furthermore, the hydrogen which is produced is consumed by the oxidation reaction. For this reason, if making the molar ratio of oxygen to ammonia rise, the hydrogen concentration of the produced gas falls. In this way, by changing the molar ratio of oxygen to ammonia which is fed to the cracker, it is possible to adjust the concentration of hydrogen and the concentration of ammonia which are contained in the gas which flows out from the hydrogen generator. Further, from the graphs of FIG. 4 and FIG. 5, it is learned that even if changing the spatial velocity of the gas which flows into the catalyst, the hydrogen concentration and ammonia concentration of the produced gas are substantially the same.

The cracker of the internal combustion engine of the present embodiment operates in the region where the molar ratio of oxygen to ammonia is Rmax or less. By adjusting the ratio of the air to the ammonia which is fed to the cracking catalyst, it is possible to adjust the ratio of the ammonia to the hydrogen of the fuel which is fed to the hydrogen injector. For example, in the operating region of the cracker of the present embodiment, by lowering the ratio of the air to the ammonia of the gas which is fed to the catalyst, it is possible to make the ratio of the ammonia to the hydrogen of the gas which is injected from the hydrogen injector rise. That is, it is possible to make the ratio of the ammonia to the hydrogen in the fuel rise. For this reason, it is possible to raise the ratio of concentration of ammonia to $NO_X$ of the exhaust which flows out from the combustion chambers. On the other hand, by making the ratio of the air to the ammonia which is fed to the catalyst rise, it is possible to make the ratio of the ammonia to the hydrogen in the gas which is injected from the hydrogen injector fall. As a result, it is possible to lower the ratio of concentration of ammonia to $NO_X$ of the exhaust which flows out from the combustion chambers.

Figure 6:
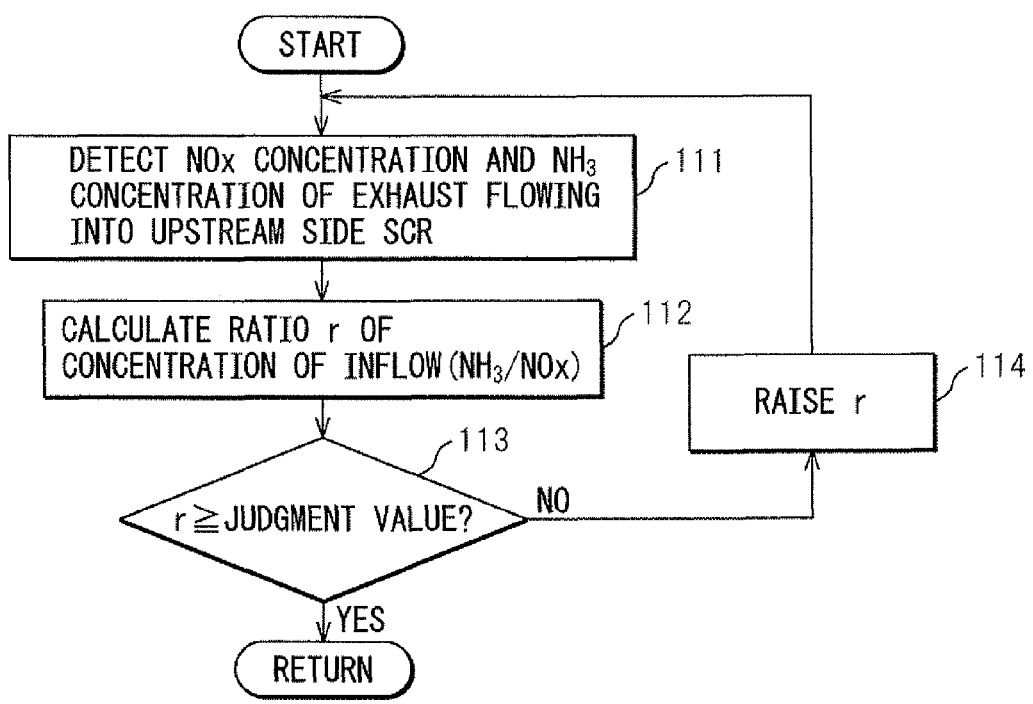
FIG. 6 is a flow chart of operational control in the embodiment.

FIG. 6 shows a flow chart of operational control of an internal combustion engine in the present embodiment. The operational control which is shown in FIG. 6 can, for example, be repeatedly performed at predetermined time intervals. In the operational control in the present embodiment, the ratio of concentration of inflow is estimated. If the estimated ratio of concentration of inflow is less than a predetermined judgment value, control is performed to make the ratio of concentration of inflow rise. Referring to FIG. 2, in the present embodiment, when the estimated ratio of concentration of inflow is positioned in the first region, control is performed to make the ratio of concentration of inflow rise and shift to the inside of the second region.

At step 111, the concentration of $NO_X$ and the concentration of ammonia which flow into the upstream side $NO_X$ selective reduction catalyst are detected. These concentrations can be detected by an $NO_X$ sensor 94 or ammonia sensor 95 which is arranged at the upstream side of the upstream side $NO_X$ selective reduction catalyst 92.

Next, step 112, the detected ammonia concentration and $NO_X$ concentration are used to calculate the ratio r of concentration of inflow ($NH_3/NO_X$).

Next, at step 113, it is judged if the ratio r of concentration of inflow is a predetermined judgment value or more. The predetermined judgment value at step 113 is the lower limit judgment value of the ratio of concentration of inflow. Referring to FIG. 2, as the predetermined judgment value, for example, it is possible to employ a ratio r1 of concentration of inflow of the boundary of the region where the $NO_X$ removal rate of the upstream side $NO_X$ selective reduction catalyst becomes substantially constant regardless of the ratio of concentration of inflow. Alternatively, since even the downstream side $NO_X$ selective reduction catalyst can remove $NO_X$, the $NO_X$ removal ability of the downstream side $NO_X$ selective reduction catalyst may also be used as the basis to set a ratio of concentration of inflow smaller than the ratio r1 of concentration of inflow. Furthermore, it is also possible to employ a ratio of concentration of inflow larger than the ratio r1 of concentration of inflow in order to secure a safety margin in the removal of $NO_X$.

When the calculated ratio r of concentration of inflow is less than a predetermined judgment value at step 113, the routine proceeds to step 114.

At step 114, control is performed to make the ratio r of concentration of inflow rise. In the present embodiment, control is performed to reduce the ratio of air to ammonia in the gas which flows into the catalyst of the hydrogen generator. For the amount of change of the ratio of air to the ammonia at this time, a predetermined amount of change may be employed. After step 114 finishes, the routine returns to step 111.

When the ratio of concentration of inflow is the predetermined judgment value or more at step 113, this control is ended. In this case, it is possible to judge that the upstream side $NO_X$ selective reduction catalyst and the downstream side $NO_X$ selective reduction catalyst are being used to remove ammonia and $NO_X$ by a high removal rate.

In this way, in the operational control of the present embodiment, when the ratio of concentration of inflow becomes lower than a predetermined judgment value, control may be performed to make the ratio of concentration of inflow rise.

Further, in the present embodiment, only the lower limit judgment value of the ratio of concentration of inflow is set, but the invention is not limited to this. An upper limit judgment value of the ratio of concentration of inflow may also be provided. For example, if the ratio of concentration of inflow becomes too large, more than necessary excess ammonia is liable to be consumed. For this reason, it is possible to provide an upper limit judgment value of the ratio of concentration of inflow and perform control to make the ratio of concentration of inflow fall when the estimated ratio of concentration of inflow exceeds the upper limit judgment value.

In the present embodiment, the ratio of the air to the ammonia which is fed to the cracker is adjusted to adjust the ratio of concentration of ammonia to $NO_X$ of the exhaust which flows into the upstream side $NO_X$ selective reduction catalyst (ratio of concentration of inflow), but the invention is not limited to this. Any device and any control which adjust the ratio of concentration of inflow may be employed.

For example, referring to FIG. 1, to adjust the ratio of hydrogen to ammonia which is fed to the combustion chambers 5, control may be performed to change the amount of injection of hydrogen from the hydrogen injector 86 and the amount of injection of ammonia from the ammonia injector 83. For example, by reducing the amount of injection of the hydrogen injector 86 while increasing the amount of injection of the ammonia injector 83, it is possible to make the ratio of concentration of ammonia to $NO_X$ of the exhaust which flows out from the combustion chambers 5 rise.

Alternatively, when providing a reducing agent injector in the engine exhaust passage for injecting urea or ammonia and feeding urea or ammonia from the reducing agent injector, it is possible to adjust the amount of injection from the reducing agent injector so as to adjust the ratio of concentration of inflow.

In the present embodiment, the output of an $NO_X$ sensor and the output of an ammonia sensor which are arranged upstream from the upstream side $NO_X$ selective reduction catalyst are used to estimate the ratio of concentration of inflow, but the invention is not limited to this. Any device and any control may be used to estimate the ratio of concentration of inflow. For example, an $NO_X$ sensor may be arranged downstream of the downstream side $NO_X$ selective reduction catalyst. In this case, if detecting the $NO_X$ concentration of the exhaust which flows out from the $NO_X$ selective reduction catalyst and the detected $NO_X$ concentration is larger than a predetermined judgment value of the $NO_X$ concentration, it is possible to judge that the $NO_X$ removal rate at the upstream side $NO_X$ selective reduction catalyst is small. That is, it is possible to judge that the ratio of concentration of inflow is smaller than a predetermined judgment value. In this case, control may be performed to make the ratio of concentration of inflow rise.

Figure 7:
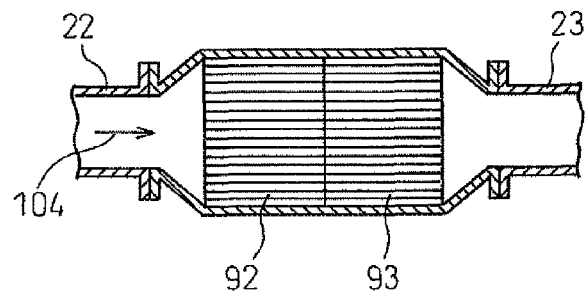
FIG. 7 is a schematic cross-sectional view of another exhaust purification system in the embodiment.

FIG. 7 is a schematic cross-sectional view of another exhaust purification system in the present embodiment. An arrow 104 shows the direction in which the exhaust flows. In this other exhaust purification system, a single substrate is formed with an upstream side $NO_X$ selective reduction catalyst 92 and a downstream side $NO_X$ selective reduction catalyst 93 which have oxidation abilities differing from each other. It is possible to arrange on a common substrate an upstream side $NO_X$ selective reduction catalyst and a downstream side $NO_X$ selective reduction catalyst. The downstream side $NO_X$ selective reduction catalyst with the high ammonia oxidation ability tends to require a higher reaction temperature than the upstream side $NO_X$ selective reduction catalyst with the small ammonia oxidation ability. For this reason, the downstream side $NO_X$ selective reduction catalyst is preferably able to keep down heat emission. By sharing the substrate, it is possible to keep down heat emission from the downstream side $NO_X$ selective reduction catalyst. Further, by a configuration sharing a substrate, it is possible to reduce the number of parts and possible to improve the production efficiency.

The exhaust purification system of an internal combustion engine in the present embodiment includes two $NO_X$ selective reduction catalysts, but the invention is not limited to this. It may also include three or more $NO_X$ selective reduction catalysts.

The hydrogen generator in the present embodiment vaporizes the liquid material, then feeds it to the cracking catalyst, but the invention is not limited to this. It is also possible to store gaseous fuel and feed the gaseous fuel to the cracking catalyst.

The cracker of the hydrogen generator in the present embodiment includes an oxidation catalyst and cracking catalyst, but the invention is not limited to this. It is also possible to apply the present invention to an internal combustion engine which is provided with a cracker which does not include an oxidation catalyst, but includes just a cracking catalyst. In this case, a heater or other outside heating device may be used to supply heat for cracking the ammonia to the cracking catalyst.

In the present embodiments, an internal combustion engine of an automobile was explained as an example, but the invention is not limited to this. The present invention can be applied to any internal combustion engine. For example, the present invention can also be applied to a gas turbine system.

In the above control, the order of the steps can be suitably switched. Further, the above embodiments may be suitably combined. In the above figures, the same or corresponding parts are assigned the same reference signs. Note that, the above embodiments are illustrative and do not limit the invention. The embodiments include changes within the scope of the claims.

The invention claimed is:

1. An internal combustion engine, comprising:
an ammonia feeder which feeds ammonia to a combustion chamber,
an upstream side $NO_x$ selective reduction catalyst which is arranged in an engine exhaust passage and which selectively reduces $NO_x$ by a feed of a reducing agent constituted by ammonia, and
a downstream side $NO_x$ selective reduction catalyst which is arranged downstream of the upstream side $NO_x$ selective reduction catalyst in the engine exhaust passage and which selectively reduces $NO_x$ by the feed of the reducing agent constituted by ammonia, the engine performing combustion so that an air-fuel ratio at the time of combustion becomes lean, wherein
the upstream side $NO_x$ selective reduction catalyst has a first region operating state where a $NO_x$ removal rate rises when a ratio of concentration of ammonia to $NO_x$ of an inflowing exhaust rises and a second region operating state where the $NO_x$ removal rate becomes substantially constant when a ratio of concentration of ammonia to $NO_x$ of the inflowing exhaust rises,
the downstream side $NO_x$ selective reduction catalyst has an ammonia oxidation ability which is larger than the upstream side $NO_x$ selective reduction catalyst, and
an electronic controller configured to maintain a ratio of concentration of ammonia to $NO_x$ of the exhaust which flows into the upstream side $NO_x$ selective reduction catalyst in the second region operating state.

2. The internal combustion engine as set forth in claim 1, wherein the upstream side $NO_X$ selective reduction catalyst contains zeolite which carries iron, while the downstream side $NO_X$ selective reduction catalyst contains zeolite which carries copper.

3. The internal combustion engine as set forth in claim 1, wherein the upstream side $NO_X$ selective reduction catalyst and the downstream side $NO_X$ selective reduction catalyst have a common substrate.

4. The internal combustion engine as set forth in claim 1, wherein the electronic controller is further configured to estimate the ratio of concentration of ammonia to $NO_x$ of the exhaust which flows into the upstream side $NO_x$ selective reduction catalyst and, when the estimated concentration ratio is less than a predetermined judgment value, to raise the ratio of concentration of ammonia to $NO_x$ of the exhaust which flows into the upstream side $NO_x$ selective reduction catalyst.

5. The internal combustion engine as set forth in claim 4, wherein the engine is formed so that at least part of the ammonia which is fed from the ammonia feeder to the combustion chambers is fed to the upstream side $NO_x$ selective reduction catalyst in an unburned state.

* * * * *